United States Patent [19]

Koebbeman

[11] Patent Number: 4,987,722

[45] Date of Patent: Jan. 29, 1991

[54] HAND-HELD BOTTLE CAP CRIMPER

[76] Inventor: Richard J. Koebbeman, 4910 Kilburn Ave., Rockford, Ill. 61101

[21] Appl. No.: 401,430

[22] Filed: Aug. 31, 1989

[51] Int. Cl.[5] .......... B65B 7/28; B21D 9/08; B23P 11/00

[52] U.S. Cl. .......... 53/353; 53/390; 29/243.517; 72/410

[58] Field of Search .......... 53/305, 344, 351, 353, 53/390, 363, 366, 390; 81/3.37, 3.44, 3.56; 72/409–411; 29/243.52, 261, 262, 268; 7/126, 151

[56] References Cited

U.S. PATENT DOCUMENTS

| | | | |
|---|---|---|---|
| 1,060,201 | 4/1913 | Meyer | 53/351 X |
| 2,020,721 | 11/1935 | Buttress | 53/128 |
| 2,058,892 | 10/1936 | Koch | 53/351 |
| 2,087,251 | 7/1937 | Gough | 53/351 |
| 2,510,226 | 6/1950 | Hooks, Jr. | 81/3.56 X |
| 2,732,741 | 1/1956 | Müller-Strobe | 81/3.44 |
| 3,009,598 | 11/1961 | Tibbetts | 72/391 |
| 3,122,948 | 3/1964 | Baugh et al. | 72/391 |
| 3,170,345 | 2/1965 | Poingt | 72/409 |
| 3,332,211 | 7/1967 | Koll et al. | 53/353 |
| 3,672,121 | 6/1972 | Kawaminani | 53/351 |
| 3,998,032 | 12/1976 | Koebbeman | 53/352 |
| 4,089,099 | 5/1978 | Nivet | 72/391 X |
| 4,534,107 | 8/1985 | Maack | 72/410 X |
| 4,612,794 | 9/1986 | Schmidt | 72/410 |
| 4,614,106 | 9/1986 | Forget | 72/409 X |

*Primary Examiner*—Robert L. Spruill
*Assistant Examiner*—Beth Bianca
*Attorney, Agent, or Firm*—Leydig, Voit & Mayer

[57] ABSTRACT

A crimper in which jaws are swung into crimping engagement with a bottle cap in response to downward movement of a plunger. Downward movement of the plunger is effected by a lever which is located below a handle joined to the body of the crimper. When the handle and the lever are squeezed, the lever is pulled upwardly toward the handle to actuate the crimper and, at the same time, the handle and the body are pressed downwardly to keep the crimper stable on the bottle. The length of the stroke of the lever may be changed by varying the setting of an adjusting screw which is carried by the lever.

7 Claims, 1 Drawing Sheet

HAND-HELD BOTTLE CAP CRIMPER

BACKGROUND OF THE INVENTION

This invention relates to a hand-held crimper for securing a cap on a bottle. More particularly, the invention relates to a crimper of the type employing a plurality of radially disposed jaws or die segments and a reciprocable plunger movable between the segments to crimp the cap on the bottle.

In one crimper of this type, the die segments are located within a housing attached to a handle. A lever member secured to one end of the handle is pivotable toward and away from the handle to reciprocate a plunger within the housing. As the plunger is slid downwardly between the die segments, the lower edge portion of the cap is folded beneath a lip formed around the opening in the neck of the bottle.

One crimper of the foregoing type is disclosed in Koebbeman U.S. Pat. No. 3,998,032. In that crimper, the lever is located above the handle and is squeezed downwardly toward the handle in order to close the die segments. As the lever is squeezed downwardly, there is a tendency to pull the handle upwardly and this causes the crimper to tend to rock relative to the bottle. Such rocking interferes with smooth operation of the crimper and can produce non-uniform crimping from bottle-to-bottle.

SUMMARY OF THE INVENTION

The general aim of the present invention is to provide a new and improved crimper which remains more stable when the crimper is operated by squeezing the lever toward the handle.

A more detailed object of the invention is to achieve the foregoing by providing a crimper in which the lever is located below the handle and is pivoted upwardly when the crimper is actuated. During such pivoting, the handle is pressed downwardly and is stabilized by the bottle. In the fully actuated position, the lower lever nests within the upper handle.

Another object of the invention is to provide a crimper of the foregoing type in which the stroke of the lever may be quickly and easily adjusted.

The invention also resides in the unique connection between the pivoted lever and the reciprocable plunger.

These and other objects and advantages of the invention will become more apparent from the following detailed description when taken in conjunction with the accompanying drawings.

DETAILED DESCRIPTION OF THE PREFERRED EMBODIMENT

Figure 4:
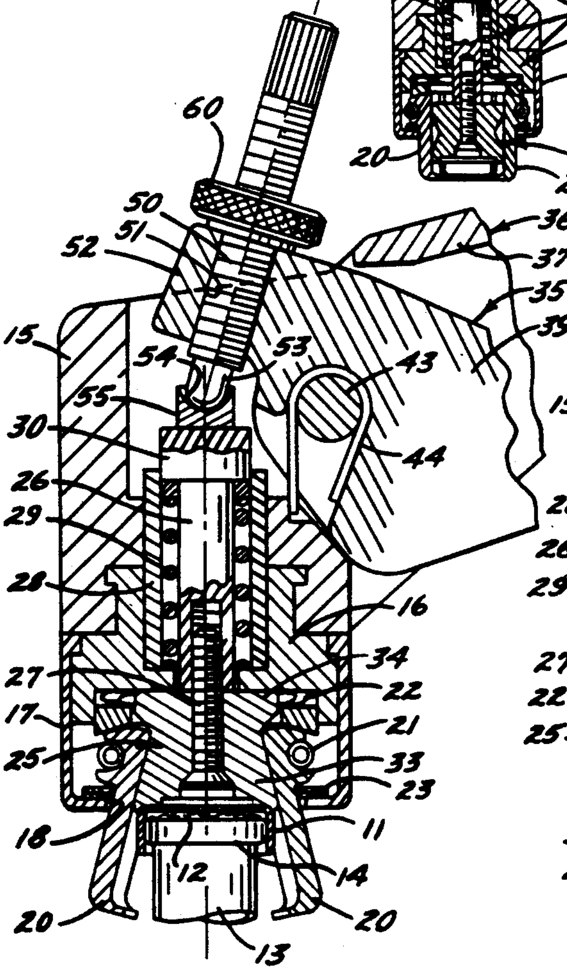
FIG. 4 is an enlarged cross-sectional view of certain parts of the crimper and shows those parts in an unactuated condition.

As shown in the drawings for purposes of illustration, the invention is embodied in a hand-held tool or crimper 10 adapted to crimp a cap 11 with a liner 12 on the top of a bottle having a neck 13 with a lip 14. The cap fits over the lip with the skirt of the cap extending downwardly beyond the underside of the lip as shown in FIG. 4. The cap is crimped on the bottle by pressing downwardly on the cap while bending the lower edge portion of the skirt inwardly beneath the lip.

The crimper 10 includes a generally cylindrical body 15 which preferably is molded of plastic and which supports an inner housing 16. A cylindrical shell 17 is located at the lower end of the body in encircling relation with the housing and is fastened between the body and the housing. The lower end of the shell is formed with an opening 18 (FIG. 4).

Figure 5:
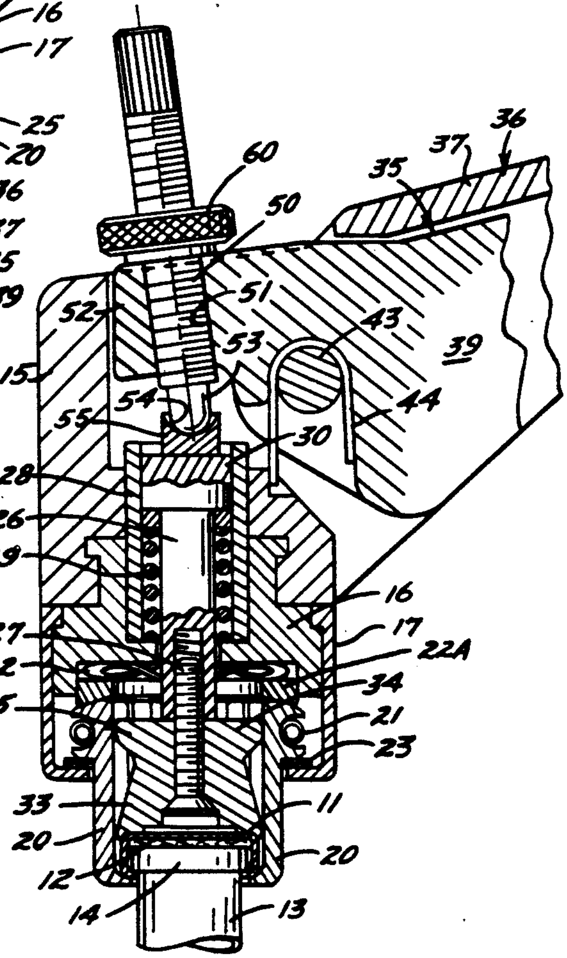
FIG. 5 is a view similar to FIG. 4 but shows the parts in an actuated condition.

Four angularly spaced crimping jaws 20 extend through the opening 18 and are supported to pivot between open positions (FIG. 4) and closed positions (FIG. 5). A garter spring 21 encircles the upper end portions of the jaws and urges the jaws toward their open positions. In addition, an annular wave spring 22 is sandwiched between the lower end of housing 16 and a plastic washer 22A at the upper ends of the jaws 20 and preloads the jaws downwardly against a retaining ring 23 at the bottom of the shell 17.

To actuate the jaws 20 an enlarged head 25 is located between the jaws and is fastened to a plunger 26 by a screw 27. The plunger is supported to slide vertically in a sleeve 28 which is secured within the body 15 and the housing 16. A coil spring 29 is telescoped over the plunger 26 and is compressed between the housing 16 and an enlarged head 30 integral with the upper end of the plunger. The spring urges the plunger 26 and the head 30 upwardly to an unactuated position in which the upper end of the head 25 engages the lower end of the housing (see FIG. 4).

As shown in FIG. 4, the lower end portion 33 of the head 25 is frustoconical in shape. The frustoconical portion 33 normally is located inside of the upper end portions of the jaws 20 and prevents the jaws from being opened beyond the open position shown in FIG. 4 by the garter spring 21. When the head 25 is shifted downwardly by the plunger 26, a frustoconical shoulder 34 on the upper end of the head cams downwardly past the upper ends of the jaws 20 and forces the jaws to pivot to their closed positions. The spring 21 automatically opens the jaws when the head is retracted upwardly.

Crimping of the cap 11 is effected by placing the head 25 downwardly against the cap while the jaws 20 are open. When the plunger 26 is depressed, the head reacts against the cap and causes the body 15 and the housing 16 to move upwardly a slight distance. This causes the frustoconical shoulder 34 to close the jaws against the neck 13 and crimp the cap to the lip 14.

In accordance with the present invention, downward shifting of the plunger 26 is effected by a lower lever 35 which is actuated by being squeezed upwardly toward an upper handle 36 which is fixed to the body 15 and which is pushed downwardly when the lever is actuated. By virtue of the handle being fixed to the body and being pushed downwardly, a substantially straight downward force is applied to the body and the head 25 to keep the crimper 10 stable on the cap 11 and to eliminate rocking of the crimper as it is actuated.

Figure 3:
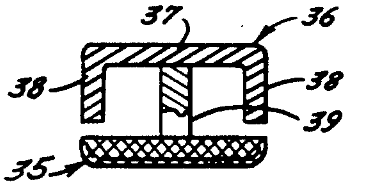
FIG. 3 is a fragmentary cross-section taken substantially along the line 3—3 of FIG. 2.
Figure 2:
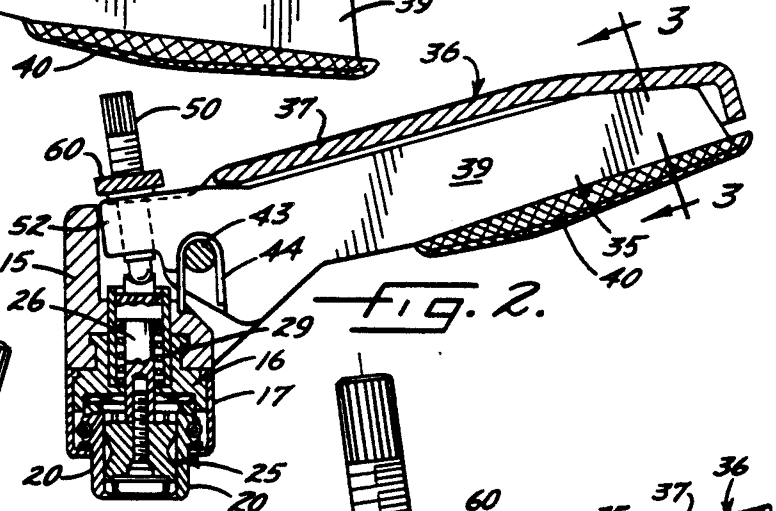
FIG. 2 is a view similar to FIG. 1 but shows the crimper in its actuated condition, certain parts being broken away and shown in section.

Preferably, the handle 36 is made of plastic and is molded integrally with the body 15. The handle is generally channel-shaped in cross-section and includes a central web 37 (FIG. 3) with two depending side flanges 38.

The lever 35 includes an elongated plate-like member 39 whose lower edge is formed with a flat gripping pad 40. Near its inner end, the lever 35 is pivotally connected to the handle 36 by a pin 43. A light torsion spring 44 encircles the pin and its ends are anchored to the body 15 and the lever 35. The spring tends to urge the lever counterclockwise about the pivot 43 and its light action prevents the weight of the lever from swinging the lever clockwise from the position shown in FIG. 1.

Means are provided for depressing the plunger 26 when the lever 35 is swung upwardly or counterclockwise about the pivot 43. Herein, these means comprise a screw 50 which is threaded through a hole 51 formed through a nose 52 on the inner end of the lever. The lower end of the screw is formed with a hemispherical tip 53 which fits into a similarly shaped socket 54 in a pad 55. The latter is located on the upper end of the head 30 of the plunger 26 and is adapted to slide horizontally across the head. When the lever 35 is pivoted, the screw tip 53 rocks within the socket 54 and, at the same time, the pad 55 slides across the head 30 to enable the tip to move vertically with the plunger while still pivoting with the lever.

Figure 1:
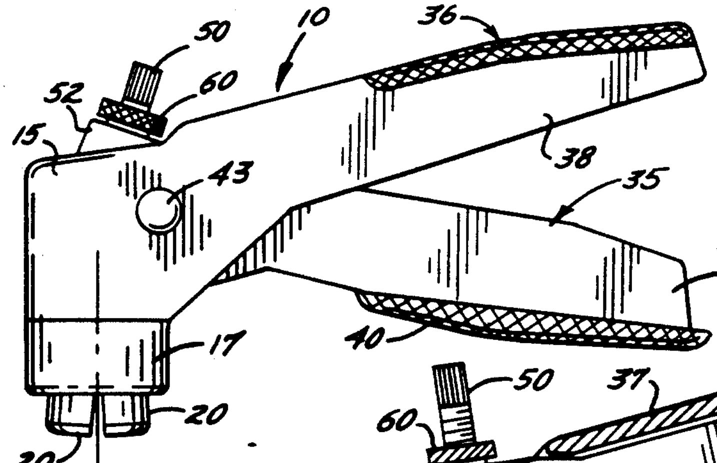
FIG. 1 is a side elevational view of a new and improved crimper embodying the unique features of the present invention, the crimper being shown in its unactuated condition.

Normally, the spring 29 acts through the plunger 26, the pad 55 and the screw 50 to urge the lever 35 clockwise about the pivot 43 to the unactuated condition shown in FIGS. 1 and 4. The turning moment exerted on the lever by the spring 29 is greater than the turning moment exerted by the spring 44 and thus the latter spring is not effective to move the lever. By squeezing the lever 35 and the handle 36, the lever is swung upwardly toward the handle (or counterclockwise about the pivot 43) to cause the screw 50 to act through the pad 55 and shift the plunger 26 downwardly for purposes of closing the jaws 20 and crimping the cap 11. When the lever 35 is fully actuated, the elongated lever member 39 nests within the handle 36 between the flanges 38 thereof and engages the web 37 to stop further actuation of the lever. Upon release of the lever, the spring 29 returns the lever to its normal, unactuated position.

Advantageously, the screw 50 may be adjusted to change the length of the actuating stroke of the lever 35 and thereby enable the crimper 10 to be set up for use with different bottles or caps. When the screw 50 is advanced further through the hole 51, the lever is swung clockwise about the pivot 43 and thus moves through a longer stroke before being stopped by the handle 36. Conversely, retraction of the screw results in the spring 44 swinging the lever clockwise so that the lever moves through a shorter stroke before the lever member 39 engages the handle. Thus, the stroke of the lever and the downward stroke of the plunger 26 may be adjusted as necessary for a particular type of bottle or cap. A lock nut 60 is threaded onto the upper end portion of the screw 50 and is adapted to clamp against the nose 52 to hold the screw in its adjusted position.

From the foregoing, it will be apparent that the present invention brings to the art a new and improved hand-held crimper 10 in which the lever 35 is located below the handle 36 and is squeezed upwardly to actuate the crimper. This enables continuous downward pressure to be exerted on the handle 36, the plunger 26 and the head 25 to prevent rocking of the crimper. Simply by adjusting the screw 50, the initial position of the lever may be changed in order to shorten or lengthen the operating stroke.

I claim:

1. A hand-held tool for crimping a cap onto the top of a container, said tool comprising a body having a lower end portion, a plurality of crimping jaws supported on the lower end portion of said body to move between open and closed positions, an upper handle fixed to said body and located above said jaws, a lower lever located beneath and pivotally connected to said handle, and means carried by said body and connected to said lever for causing said jaws to pivot to said closed position when said handle and said lever are squeezed and said lever is pivoted upwardly toward said handle, said means comprising a screw threaded into said lever, said screw being adjustable to change the initial position of the lever relative to said handle.

2. A hand-held tool as defined in claim 1 in which said handle is generally channel-shaped in cross-section and includes an upper web and a pair of flanges depending from the sides of said web, the upper side of said lever engaging the lower side of said web to stop upward pivoting of said lever in a fully actuated position.

3. A hand-held tool as defined in claim 2 in which a portion of said lever nests within said handle and between said flanges when said lever is in said fully actuated position.

4. A hand-held tool as defined in claim 1 further including means for releasably locking said screw in a fixed position.

5. A hand-held tool for crimping a cap onto the top of a container, said tool comprising a body having a lower end portion, a plurality of crimping jaws supported on the lower end portion of said body to swing between open and closed positions, a vertically movable plunger supported by said body, said plunger being operable when moved downwardly to swing said jaws to said closed positions, and means for moving said plunger downwardly, said tool being characterized in that said means comprise an upper handle fixed to said body and located above said jaws, a lower lever having inner and outer end portions, said lever being located beneath said handle and being pivotally connected to said handle between said inner and outer end portions, and selectively adjustable means on the inner end portion of said lever and operable to move said plunger downwardly when said handle and lever are squeezed and said outer end portion of said lever is pivoted upwardly toward said handle, said adjustable means comprising a screw, a threaded hole formed through the inner end portion of said lever, said screw being threaded into said hold and having an end which is operable to move said plunger downwardly when the outer end portion of said lever is pivoted upwardly toward said handle.

6. A hand-held tool as defined in claim 5 further including a pad located between said plunger and said screw and slidable horizontally on said plunger, said pad having a substantially hemispherical socket, said end of said screw being rounded and being located in said socket.

7. A hand-held tool for crimping a cap on to the top of a container, said tool comprising a body having a lower end portion, a plurality of crimping jaws supported on the lower end portion of said body to swing between open and closed positions, a vertically movable plunger supported by said body, said plunger being operable when moved downwardly to swing said jaws to said closed positions, and means for moving said plunger downwardly, said tool being characterized in that said means comprise an upper handle fixed to said body and located above said jaws, a lower lever having inner and outer end portions, said lever being located beneath said handle and being pivotally connected to said handle between said inner and outer end portions, selectively adjustable means on the inner end portion of said lever and operable to move said plunger downwardly when said handle and lever are squeezed and said outer end portion of said lever is pivoted upwardly toward said handle, and a first spring acting to urge said plunger upwardly and acting through said plunger to urge the outer end portion of said lever downwardly away from said handle, and a second spring acting between said body and said lever to urge the outer end portion of said lever upwardly toward said handle, the moment exerted on said lever by said first spring being greater than the moment exerted on said lever by said second spring when said lever is in said fully actuated position.

* * * * *